M. DRANE.
CIRCUIT CONTROLLER.
APPLICATION FILED DEC. 23, 1916.
1,275,541.
Patented Aug. 13, 1918.
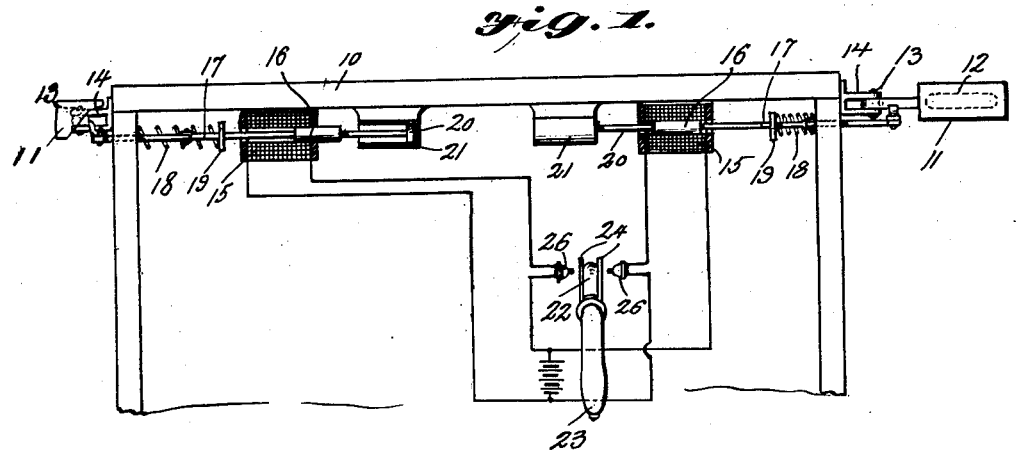
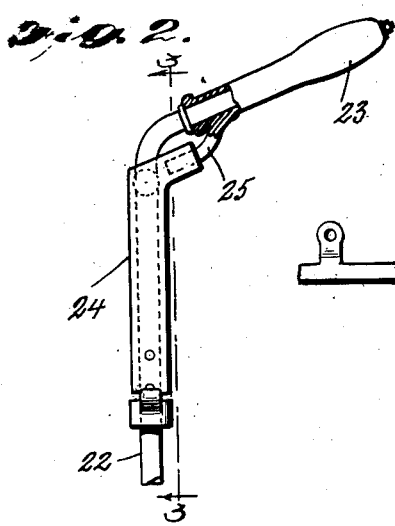
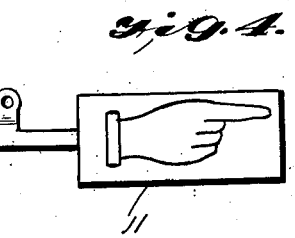
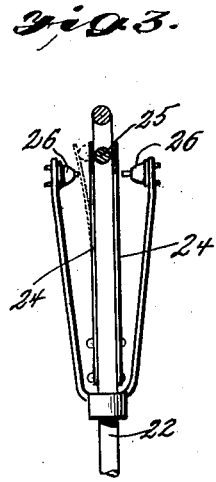
Inventor
Merritt Drane
By Max A. Schmidt
Attorney

UNITED STATES PATENT OFFICE.

MERRITT DRANE, OF LOUISVILLE, KENTUCKY.

CIRCUIT-CONTROLLER.

1,275,541.   Specification of Letters Patent.   Patented Aug. 13, 1918.

Application filed December 23, 1916. Serial No. 138,605.

*To all whom it may concern:*

Be it known that I, MERRITT DRANE, a citizen of the United States, residing at Louisville, in the county of Jefferson and State of Kentucky, have invented certain new and useful Improvements in Circuit-Controllers, of which the following is a specification.

This invention relates to signal devices employed in connection with motor vehicles to indicate the fact that the driver is about to make a turn, and also the direction in which the turn is to be made, thereby giving notice of the intention of the driver of the car.

The invention has for its object to provide a novel and improved circuit controller for an electrically operated signal device of the kind stated which is efficient in operation, and easily actuated.

The object stated is attained by means of a combination and arrangement of parts to be hereinafter described and claimed, and in order that the same may be better understood, reference is had to the accompanying drawing forming a part of this specification.

In the drawing Figure 1 is a plan view of the device, partly in section and diagrammatic; Fig. 2 is a side elevation partly in section showing a switch operating device; Fig. 3 is a section on the line 3—3 of Fig. 2, and Fig. 4 is a face view of an indicator or signal member.

Referring specifically to the drawing, 10 denotes a fragment of the front of the body of an automobile or other motor vehicle. On each side of the car body is mounted a pivoted visual signal member or indicator 11 which is in the form of a casing inclosing an electric lamp 12, so that the signal may be observed after dark, and also having on its rear and front faces the representation of a hand. The indicator is pivoted at 13 to a suitable bracket 14 mounted on the side of the car body 10 at the front end thereof, and it swings in a vertical plane. Normally, the indicator rests in upright position alongside the car body, and when the signal is to be given, it is swung down into horizontal position to extend straight outward from the car. As each side of the car is equipped with an indicator, the direction in which the car is to turn will be indicated by projecting the indicator on that side of the car toward which the turn is to be made.

The following means are provided for controlling the indicators 11:

On the front wall of the car body 10, inside the car, is mounted a solenoid 15 having its core 16 connected by a rod 17 to one of the indicators 11, whereby the latter is swung into display position when the solenoid is energized and its core is moved. The other indicator 11 is also provided with a solenoid and operating connections. A spring 18 coiled around the rod 17 between the side of the car body and an abutment 19 on the rod, serves to retract the rod to raise the indicator to inoperative position. The rod 17 is also fitted with a plunger 20 working in a dashpot cylinder 21 to prevent the too rapid action of the solenoid, and thus avoid breaking of the filament of the lamp 12 associated with the indicator.

The following switch mechanism is provided for selectively controlling the solenoids 15:

The invention is shown applied to an electric automobile having the usual steering rod 22 provided with a hand grip 23 which is rotatable. On opposite sides of the steering rod are fixed, at one end, flat springs 24 which are free at their other ends and terminate thereat close to the forward end of the hand grip. On the last mentioned end of the hand grip is fixed a finger 25 which extends between the free ends of the springs. Alongside each spring, adjacent to the free end thereof, is positioned a push button or other suitable type of switch 26. One of these switches controls the circuit of one of the solenoids, and the other switch controls the circuit of the other solenoid. The switches will be mounted and supported alongside the springs in any suitable manner.

The switches are operated by rotating the hand grip 23, whereupon the finger 25 presses one of the springs 24 against the adjacent switch to close the selected solenoid. Turning the hand grip in one direction operates one of the switches, and when the hand grip is turned in the opposite direction, the other switch is operated. The indicator 11 to be displayed is therefore selected and placed in display position by a mere turn of the hand grip, a turn to the right setting the right indicator, and a turn to the left setting the left indicator. Upon turning the hand grip back to release the pressure of the finger 25 against the spring 24 which is engaging the switch, said spring draws back, and the switch is permitted to open, whereupon the solenoid circuit is broken, and the spring 18 restores the indicator to inoperative position.

The preferred embodiments of the invention have been shown, but it will be understood that various changes and modifications may be made without a departure from the spirit and scope of the invention as claimed hereinafter.

I claim:

A circuit controller comprising a support, a rotatable member on the support, a rigid finger projecting from said member, a pair of resilient members between which said finger extends, and switch units positioned adjacent to the resilient members on the outside thereof, and adapted to be actuated by said members.

In testimony whereof I affix my signature in the presence of two witnesses.

MERRITT DRANE.

Witnesses:
ALEXANDER C. SCHUMAN,
GEO. E. SCHUMAN.